Aug. 30, 1955 S. WEEN ET AL 2,716,342
THERMOMETER
Filed April 16, 1953
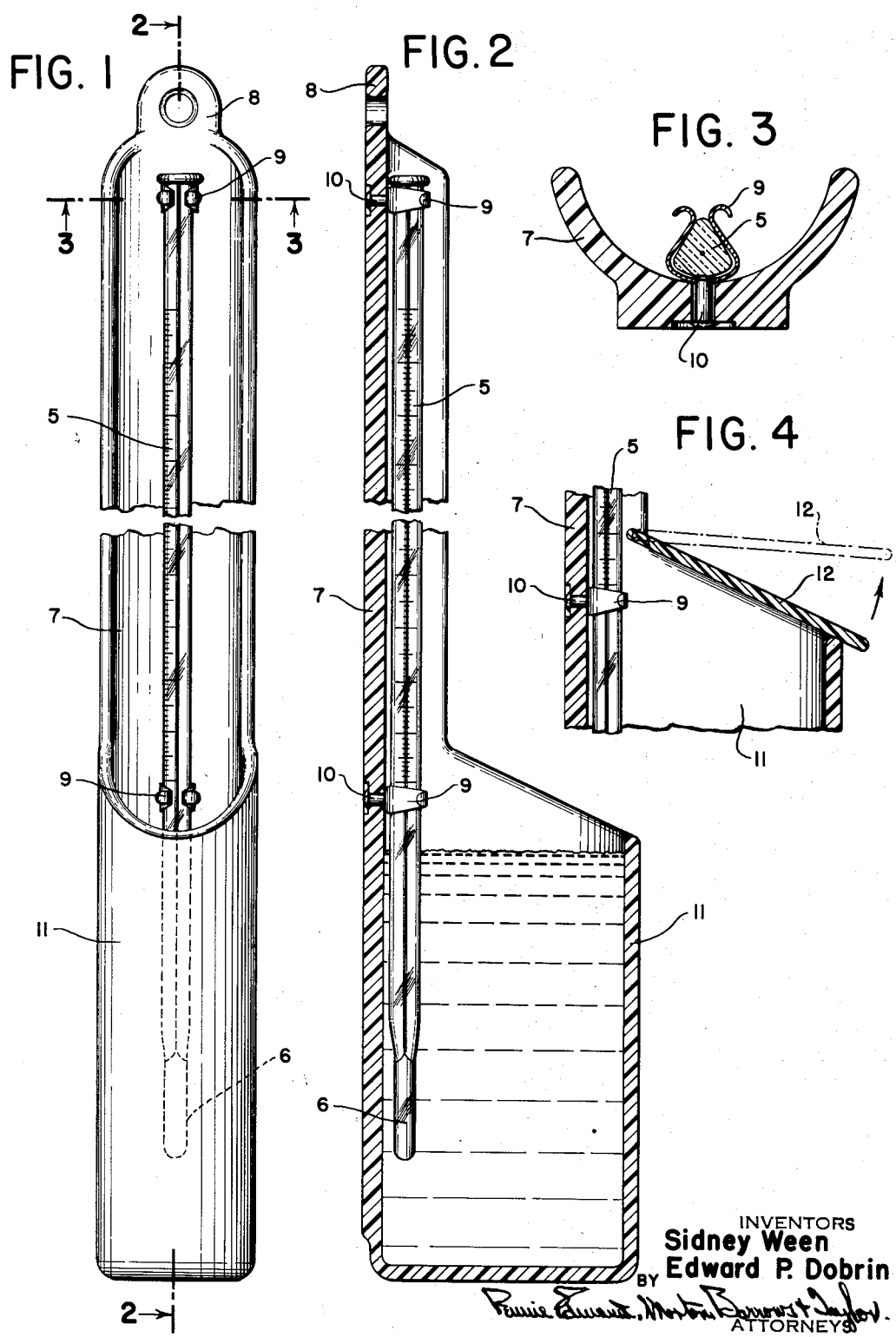
INVENTORS
Sidney Ween
Edward P. Dobrin
BY
ATTORNEYS

United States Patent Office 2,716,342
Patented Aug. 30, 1955

2,716,342
THERMOMETER

Sidney Ween and Edward P. Dobrin, New York, N. Y., assignors to Weksler Thermometer Corporation, New York, N. Y., a corporation of New York Application April 16, 1953, Serial No. 349,208

1 Claim. (Cl. 73—354)

This invention relates to thermometers, and more particularly to thermometers adapted for use in the oil and chemical industries for sampling liquids contained in large tanks or vats. Our improved thermometer is of the type which includes a well at the lower end of the case of the thermometer such that the thermometer may be lowered into a tank or vat to fill the well with the liquid therein and thereafter withdrawn and used to give an indication of the temperature of the liquid.

The thermometer of this invention is distinctive in that the case of the thermometer tube is a single integral piece of a molded plastic material capable of withstanding high temperature without warping or disintegration. As so made, there is far less danger of some part of the thermometer case becoming detached and falling off within the tank, as has frequently occurred with thermometers of this general type as heretofore made.

Another distinctive feature of the case of this thermometer is that the well of the piece, and preferably the entire case, is made of a material that substantially reduces the rate of transmission of heat through its wall. This is of major importance in thermometers of this type. As made heretofore, such thermometers of this general type have required that a reading of the thermometer be made immediately after withdrawing it from the liquid or that a suitable factor be introduced to compensate for the loss of heat by radiation. In our improved thermometer, in which the well is formed of a molded plastic material, the wall of the well is of substantial thickness and the material permits heat to pass therethrough but slowly, with the result that it is not required that a reading be made promptly on withdrawing the thermometer from the tank or that a compensating factor be introduced into a reading.

The case for the thermometer consists of an elongated piece of molded plastic material having the bottom portion thereof formed into a well. The upper portion is a straight piece and is preferably curved in cross-section, and the glass tube of the thermometer is detachably mounted upon this upright piece with its lower end including the bulb extending down into the well. The molded case is preferably provided with feet at its lower end so that the case will stand upon a horizontal surface, and with a handle at the upper end. The material used in making the case will not discolor by reason of the chemicals or oils with which it is used, and it is of such a nature that it will absorb a great deal of punishment due to shock and hard use without deterioration.

The construction which we prefer to employ is illustrated in the accompanying drawing, in which Fig. 1 is a front view of the thermometer;
Fig. 2 is a vertical section;
Fig. 3 is a transverse section on the line 3—3 of Fig. 1; and
Fig. 4 is a vertical sectional view illustrating a modified construction.

The thermometer includes the usual glass tube 5 having a bulb 6 at its lower end and containing a column of mercury. The tube 5 is mounted upon the front face of a supporting case 7. The case 7 is of a length somewhat greater than the glass tube, and its main wall is preferably of uniform section throughout. The section which we prefer to employ is that illustrated in Fig. 3, which shows the upright portion of the case as curved in cross-section to give it the form of a trough and provided with a flat rear wall adapted to lie against a vertical surface. The upper end of the case is formed to provide a handle 8 with a hole therethrough for a supporting cord or chain. The tube 5 is detachably mounted upon the vertical wall of the case, as shown in Fig. 3, by means of spring clamps 9 which are secured to the case by rivets 10. When the glass column is of triangular section, as is indicated, it can be readily inserted in and withdrawn from these spring clamps.

The lower portion of the case is a well 11 open at its upper end and having the lower end of the tube 5 extending well down into it.

A thermometer for use in the oil and chemical industries, when constructed in accordance with the distinctive features of the type illustrated and described, possesses many advantages over those heretofore employed. Making the case of the instrument of a unitary molded plastic practically eliminates detachment of a part when the thermometer has been lowered into a tank or vat. Such detachment has occurred frequently with instruments as heretofore made, causing great inconvenience and expense. Also, the use of the molded plastic material in making the well of the case reduces very considerably the radiation of heat from the liquid within the well, and this permits of use of the instrument without either proceeding with great promptitude to a reading after withdrawing the thermometer from the tank or introducing a compensation factor for the escape of heat from the liquid in the well.

Fig. 4 illustrates an additional feature, which is desirable in some instances. A cover 12 is provided for the upper end of the well 11. This cover is hinged and closes by gravity. When the instrument is lowered into the liquid in a vat or tank, the cover 12 is raised by the liquid to permit filling of the well 11, and then, when the instrument is withdrawn from the liquid, the cover 12 closes by gravity. The lid thus forms an additional preventive against spilling of the liquid in the well and loss of heat from that liquid.

We claim:

A thermometer comprising an elongated tube having a bulb at its lower end and containing a heat-responsive liquid, a case having a front face and consisting of a unitary piece of molded plastic capable of withstanding high temperature and being of greater length than the tube and having the tube mounted upon the front face thereof, a well formed as an integral part of the case at its lower end, said well having a closed bottom and an open upper end, the lower end of the tube extending into the well, and a hinged cover for the upper end of the well, said cover being so hinged to the well as to close by gravity and having a portion extending beyond the well to be engaged by liquid when the well is being submerged in a body of liquid, whereby mere descent of the well in a body of liquid will cause the lid to open, and withdrawal of the well from the body of liquid will cause the lid to close.

References Cited in the file of this patent

UNITED STATES PATENTS

| | | |
|---|---|---|
| 1,062,678 | Witt | May 27, 1913 |
| 1,393,279 | Gersdorff | Oct. 11, 1921 |
| 1,471,015 | Tompkins | Oct. 16, 1923 |
| 2,037,194 | Curtin | Apr. 14, 1936 |
| 2,107,468 | Canuteson | Feb. 8, 1938 |

FOREIGN PATENTS

| | | |
|---|---|---|
| 841,046 | Germany | June 9, 1952 |